US011448533B2

(12) United States Patent
Ainger et al.

(10) Patent No.: US 11,448,533 B2
(45) Date of Patent: Sep. 20, 2022

(54) CONTAINMENT SYSTEM FOR SENSING ELEMENTS

(71) Applicant: Nuron Limited, London (GB)

(72) Inventors: Michael Ainger, London (GB);
Andrew McCulloch, Suffolk (GB);
Paul Dickenson, Surrey (GB)

(73) Assignee: Nuron Limited, London (GB)

( * ) Notice: Subject to any disclaimer, the term of this patent is extended or adjusted under 35 U.S.C. 154(b) by 94 days.

(21) Appl. No.: 16/638,361

(22) PCT Filed: Aug. 10, 2018

(86) PCT No.: PCT/GB2018/052287
§ 371 (c)(1),
(2) Date: Feb. 11, 2020

(87) PCT Pub. No.: WO2019/030537
PCT Pub. Date: Feb. 14, 2019

(65) Prior Publication Data
US 2020/0166390 A1 May 28, 2020

(30) Foreign Application Priority Data

Aug. 11, 2017 (GB) ...................................... 1712911

(51) Int. Cl.
*G01F 1/002* (2022.01)
*G01F 1/661* (2022.01)
*G01F 15/14* (2006.01)
(Continued)

(52) U.S. Cl.
CPC .............. *G01F 1/002* (2013.01); *G01F 1/661* (2013.01); *G01F 15/14* (2013.01); *G02B 6/4459* (2013.01);
(Continued)

(58) Field of Classification Search
CPC .......... G01F 1/002; G01F 1/661; G01F 15/14; G02B 6/4459; G02B 6/502; H02G 1/086; H02G 9/06; H02G 1/08; H02G 3/38
(Continued)

(56) References Cited

U.S. PATENT DOCUMENTS 6,523,986 B1    2/2003  Hoffmann
7,041,912 B2 *  5/2006  Kadrnoska ........... G02B 6/4459
                                                    174/138 G
(Continued)

FOREIGN PATENT DOCUMENTS

DE          19836923       2/2000
DE        102012021415     1/2014
(Continued)

OTHER PUBLICATIONS

Search Report and Written Opinion for GB1712911.5, dated Oct. 2, 2017.
(Continued)

*Primary Examiner* — Nathaniel T Woodward
(74) *Attorney, Agent, or Firm* — Andrus Intellectual Property Law, LLP

(57) ABSTRACT

A containment system for installation internally along a conduit, for co-locating at least one sensing element and one or more communication media within the conduit, the containment system comprising: an elongate flexible body mountable on a wall of the conduit to extend longitudinally along the conduit, the body including: an elongate sensor cavity, extending longitudinally along the body, for receiving the at least one sensing element; and a shield portion including one or more elongate channels, extending longitudinally along the shield portion, each channel for receiving one or inure communication media.

23 Claims, 10 Drawing Sheets

(51) Int. Cl.
*G02B 6/44* (2006.01)
*G02B 6/50* (2006.01)
*H02G 1/08* (2006.01)
*H02G 9/06* (2006.01)

(52) U.S. Cl.
CPC ............ *G02B 6/502* (2013.01); *H02G 1/086* (2013.01); *H02G 9/06* (2013.01)

(58) Field of Classification Search
USPC .......................................................... 73/279
See application file for complete search history.

(56) References Cited

U.S. PATENT DOCUMENTS

| | | | |
|---|---|---|---|
| 2003/0051808 A1 | 3/2003 | Herrmann et al. | |
| 2004/0258385 A1 | 12/2004 | Kadrnoska et al. | |
| 2006/0071158 A1 | 4/2006 | Van Der Spek | |
| 2006/0165344 A1 | 7/2006 | Mendez et al. | |
| 2011/0311179 A1* | 12/2011 | Greenaway | E21B 47/135 385/12 |

FOREIGN PATENT DOCUMENTS

| | | | |
|---|---|---|---|
| EP | 1447893 | 8/2004 | |
| EP | 1447893 A1 * | 8/2004 | ............. H02G 1/088 |
| EP | 2725186 | 4/2014 | |
| GB | 2526247 | 11/2015 | |
| GB | 2555669 | 5/2018 | |
| WO | 2009087371 | 7/2009 | |
| WO | 2012178143 | 12/2012 | |
| WO | 2013052543 | 4/2013 | |
| WO | 2017021702 | 2/2017 | |
| WO | WO-2017021702 A1 * | 2/2017 | ........... G01F 15/022 |

OTHER PUBLICATIONS

Search Report and Written Opinion for GB1813100.3, dated Jan. 30, 2019.

International Search Report and Written Opinion for PCT/GB2018/052287, dated Dec. 4, 2018.

* cited by examiner

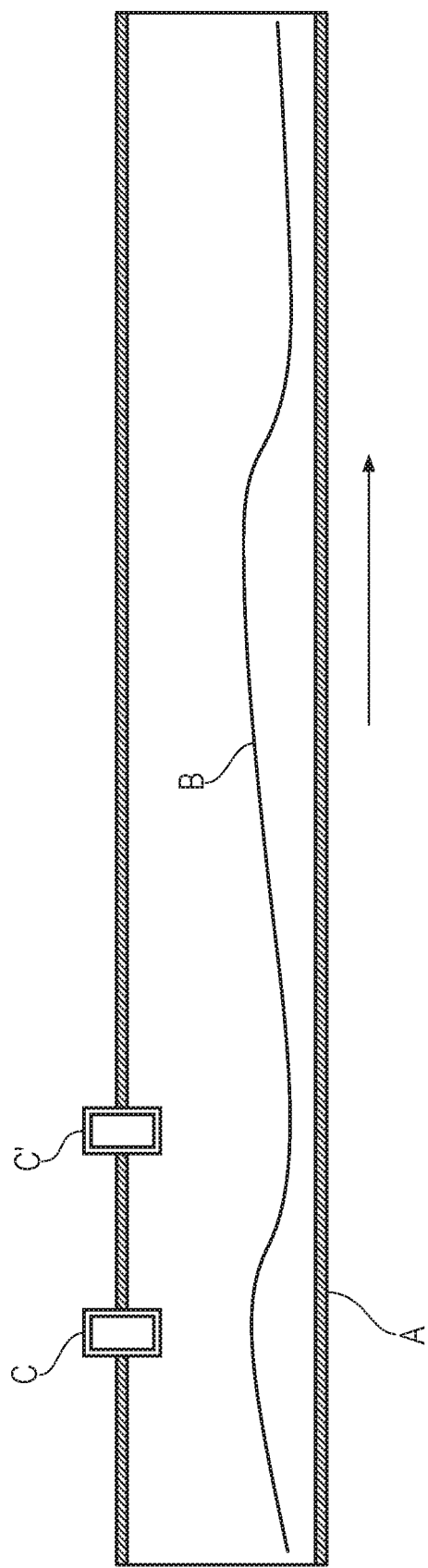
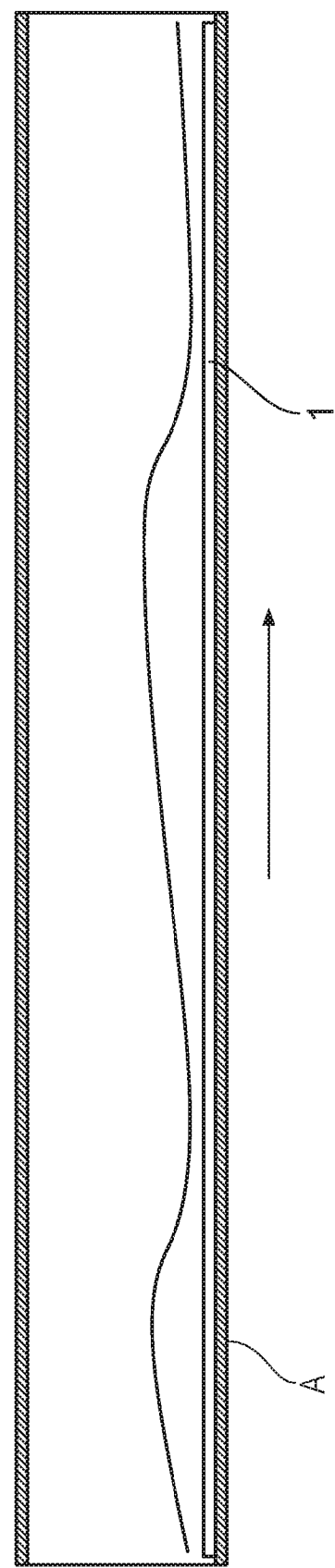
FIG. 1a (Prior Art)
FIG. 1b

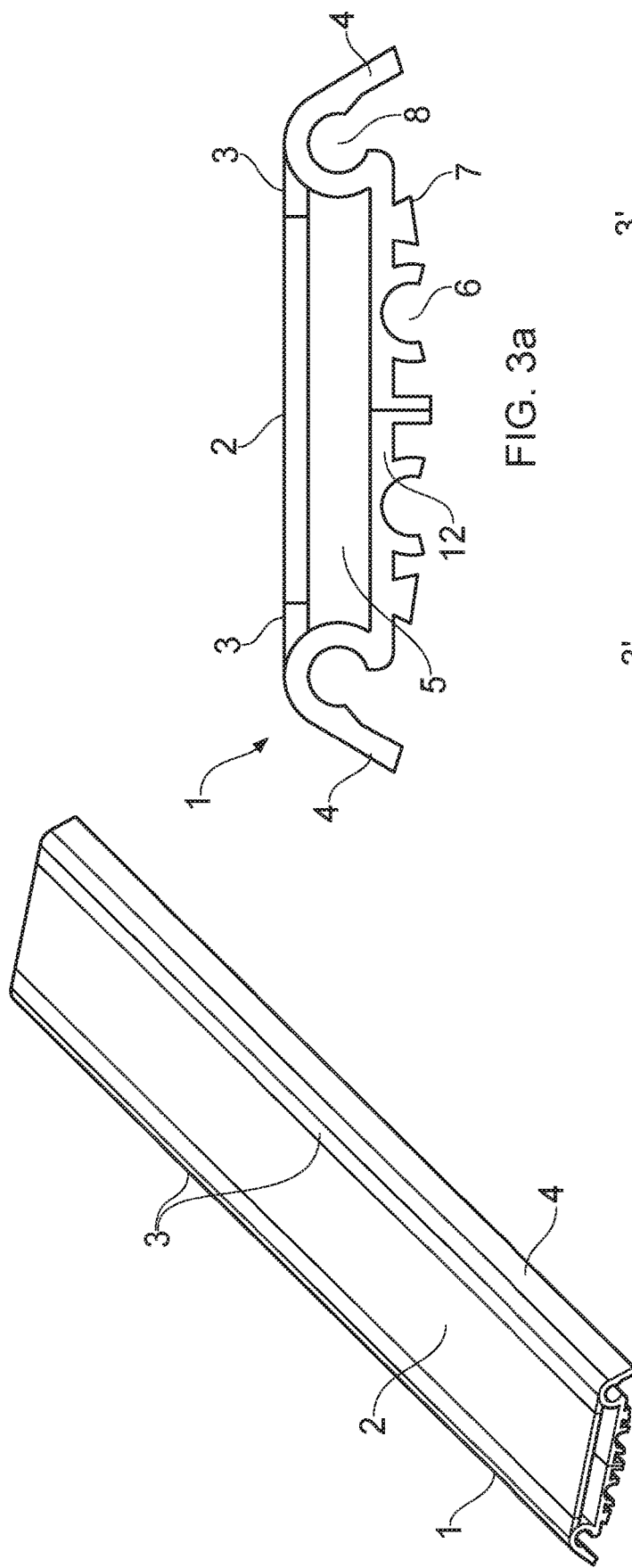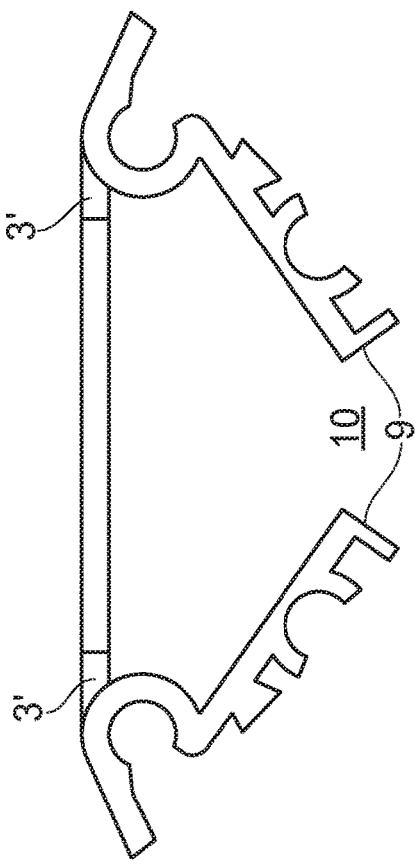

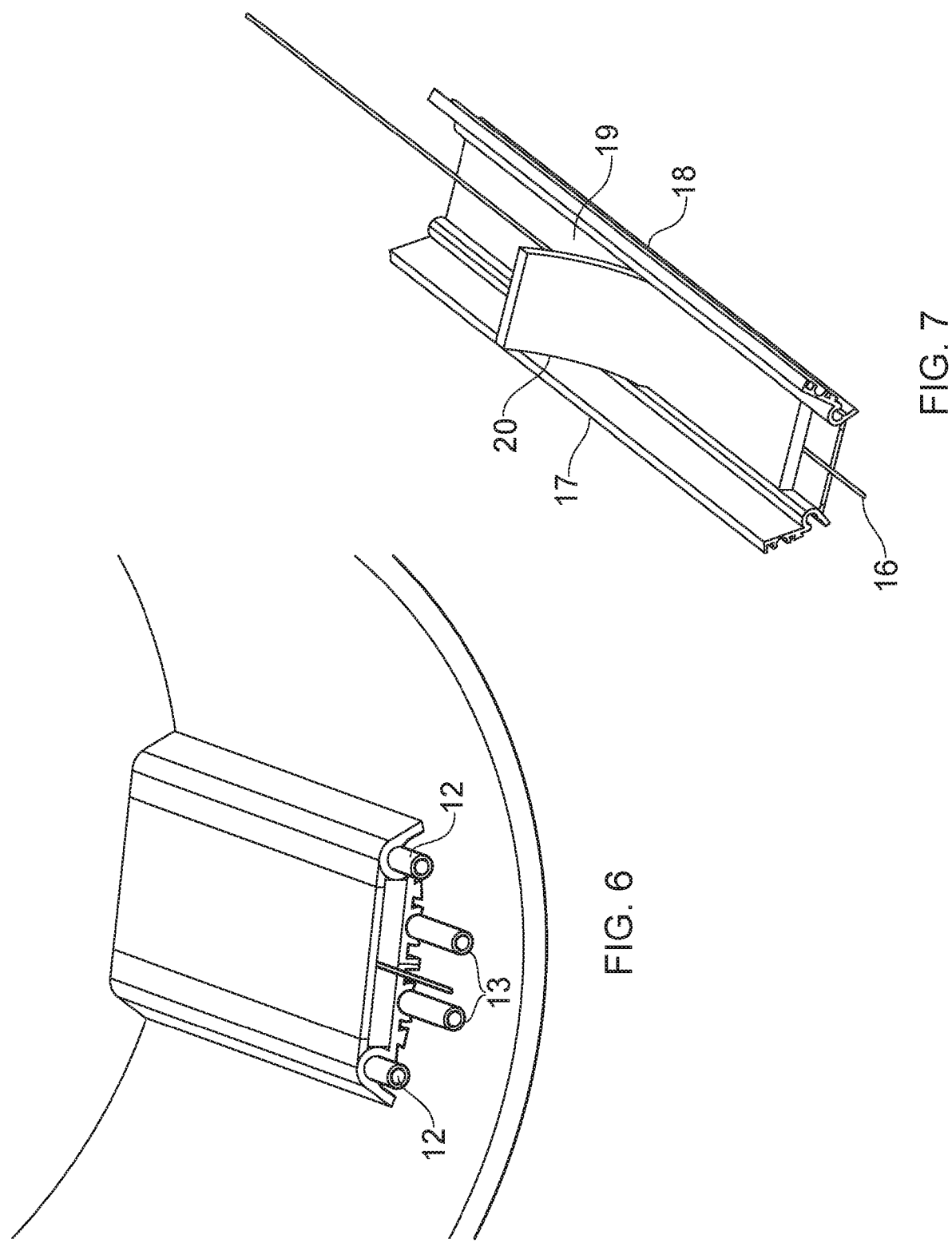

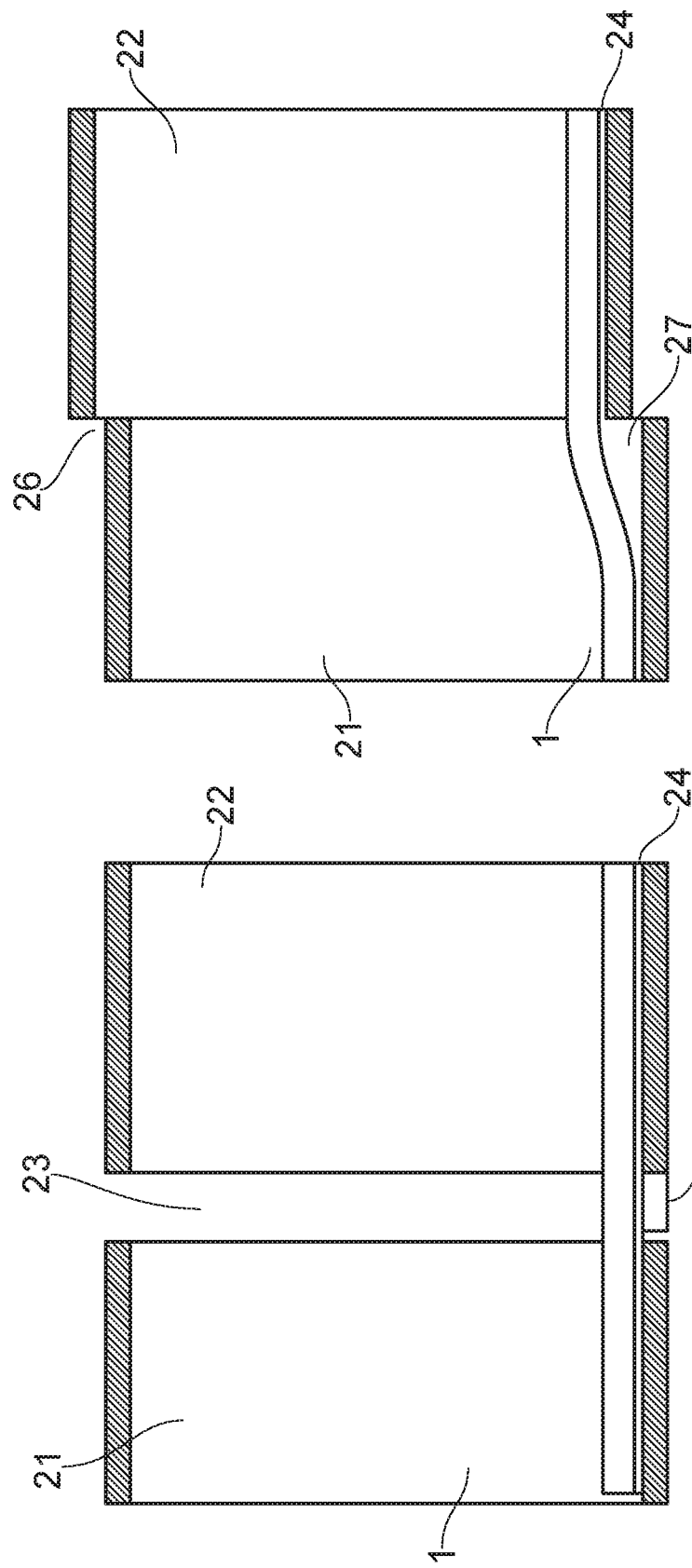

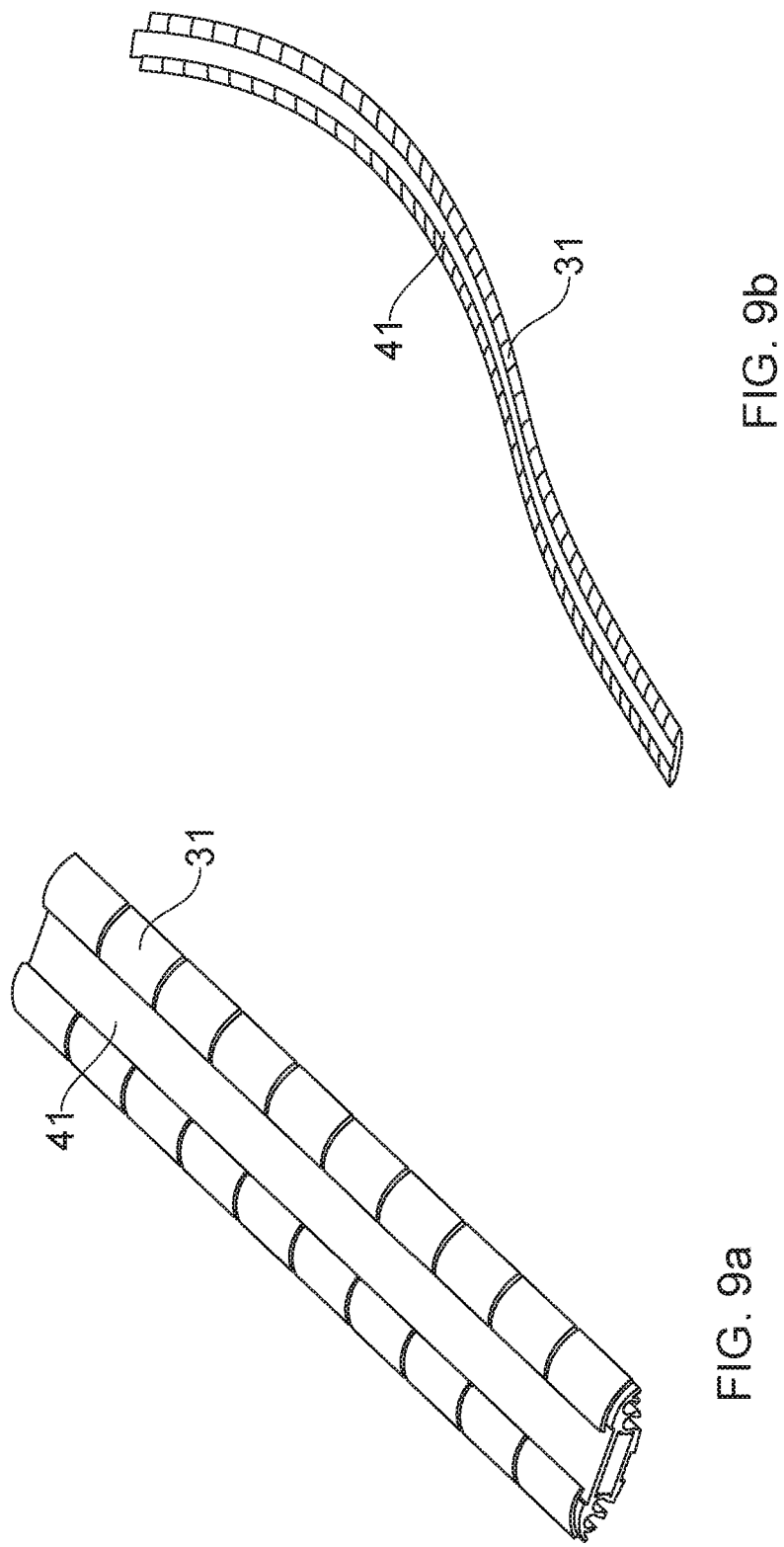

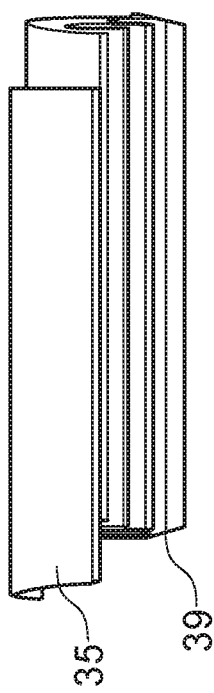
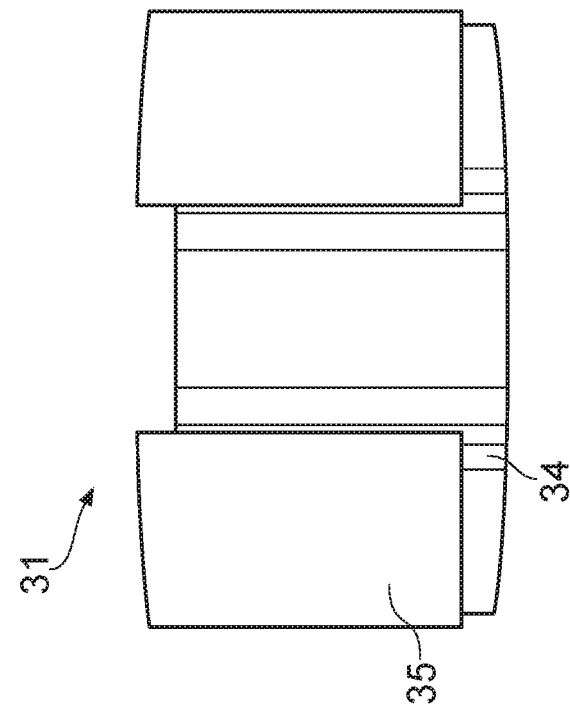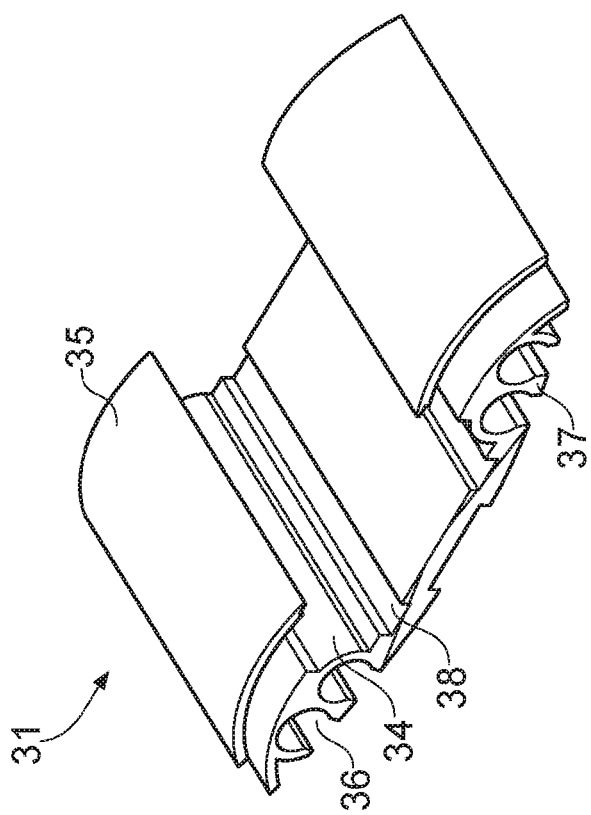

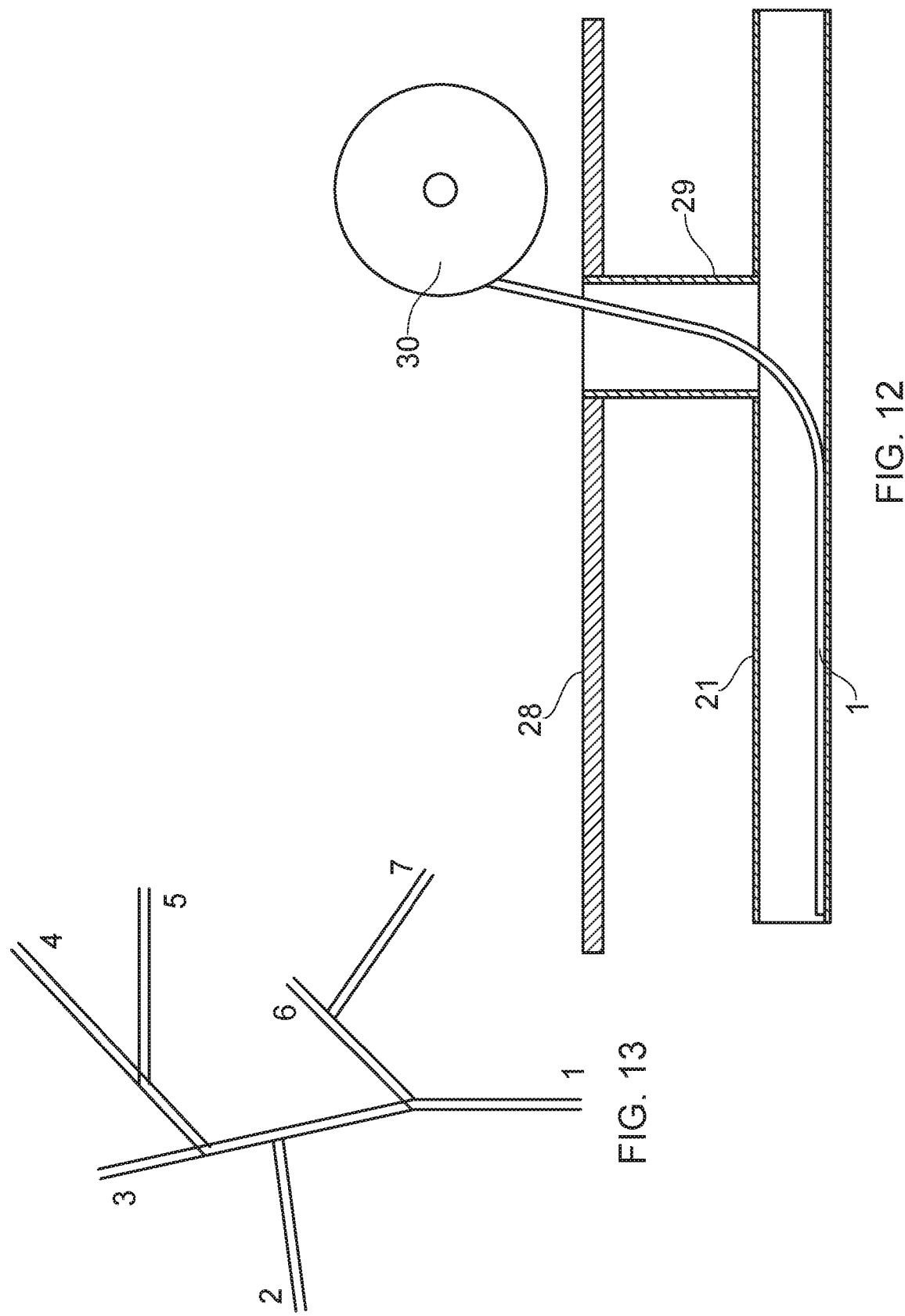

CONTAINMENT SYSTEM FOR SENSING ELEMENTS

CROSS-REFERENCE TO RELATED APPLICATIONS

This application is the U.S. national stage application of International Application PCT/GB2018/052287, filed Aug. 10, 2018, which international application was published on Feb. 14, 2019, as International Publication WO2019/030537 in the English language. The international application is incorporated herein by reference, in entirety. The international application claims priority to GB Patent Application No. 1712911.5, filed Aug. 11, 2017 which is incorporated herein by reference, in entirety.

FIELD OF THE INVENTION

The present invention relates to containment systems for installation in conduits to locate and protect communication media and/or fluid flow sensing elements within the conduit. The communication media and/or sensing elements may be optical fibres.

BACKGROUND OF THE INVENTION

Sensing of flow in open channel conduits such as sewers has traditionally been performed using discrete or point methods such as ultrasonic depth sensors. FIG. 1a schematically shows such a prior art system with an angled conduit (A) with standing liquid wave (B) where flow is in the direction of the arrow and where discrete sensor C detects a standing wave crest and discrete sensor C' in a different position detects a standing wave trough.

This methodology has inherent shortcomings in terms of accuracy, longevity and cost/complexity. Discrete flow monitoring may not give completely accurate results due to sensor positioning and the potential (for example) for: standing waves to form under the sensor, giving a false depth reading (high if the sensor is over the crest of the standing wave and low if the trough of the wave happens to be positioned under the sensor—see FIG. 1a).

Due to the sewer environment, sensors which have a relatively small transduction surface are prone to failure or loss of calibration due to clogging by foreign bodies or dirt, ultrasonic depth sensors fall into this category. Discrete depth sensors also require power, or at least require information to be transmitted from each individual sensor. For a long length (~100 km of pipe) that requires data collection, this may mean a large number of wired or wireless devices that have to be managed.

Powered devices in sewers may also require ATEX (Explosive Atmosphere) approval, i.e. electronics and casing components must conform to strict regulations governing electronic devices in a potentially explosive atmosphere. There is a risk of this scenario arising from a build-up of methane due to decomposing organic matter in the sewer.

WO 2017/021702 describes an alternative approach to sensing fluid flow in a conduit, using an optical sensor fibre installed along the base of the conduit, which addresses many of the shortcomings of the more conventional sensing systems discussed above. It is particularly suited to open channel systems, such as sewers. By measuring the depth, pressure and velocity of fluid in an open channel such as a sewer on a distributed basis as shown in FIG. 1.b, flow data can be calculated and useful information about the state of the sewer and sewer system can be derived. Other distributed monitoring systems can be contemplated which would need to be installed similarly in the base of the conduit.

However, as an example of an open channel system, a sewer is a challenging environment for an in-dwelling product, particularly if it is submerged for extended periods of time. Water/fluid ingress protection is essential to ensure long term functionality, particularly if sensitive electronics or optics are involved. Resistance to chemical attack is also critical; sewers can experience extremes of pH and exposure to organic solvents.

Sewers are also exposed to high pressure (160 atm) water jet cleaning. Any long term sewer based product would have to withstand this cleaning process.

Rodent attack must also be taken into consideration in sewers. Rats can easily chew through plastic and rubber conduits and pipes.

Systems must also be resistant to impact from foreign objects in fluid flow such as rocks, bricks and branches introduced via flood water as well as objects, such as bricks, dropped from height and from people standing on exposed elements around man holes.

Although sewers generally have a constant fluid flow from small pipes to large pipes, this does not necessarily mean the water flow pathway is smooth or consistent. Clay and ceramic pipes in particular have many junctions along their length, each junction may have a step or ledge and there may also be gaps between pipes which will have to be traversed.

Sewers offer a ready-made conduit system that can be used for communications media. Conduits run continuously from individual houses to large trunk routes to ensure an uninterrupted fluid flow. A communications system that used this network would benefit from a reduced need to excavate channels to lay cable. Conduits range from domestic 110 mm diameter pipes up to 600 mm pipes and beyond for major municipal sewers.

Sewers larger than 900 mm in diameter can be accessed by a person, sewers smaller than 900 mm are generally accessed remotely using robots, drain rods and camera systems.

It is known to install communication fibres in sewers by loose laying them in the base of the conduit. It is also known to install the fibres by attaching them to the wall of the sewer above the expected normal level of fluid in the sewer. Generally this involves invasive attachment at intervals to the sewer wall of a support for the fibres, e.g. with screws, bolts or expansion rings.

Thus, there is a need for a containment system for installation in conduits (e.g. sewers) that can locate and protect communication media and/or fluid flow sensing elements (both of which may be optical fibres) within the conduit.

SUMMARY OF THE INVENTION

Accordingly, the present invention aims to meet the above need by providing, according to a first aspect, a containment system for installation internally along a conduit, for co-locating one or both of: a sensing element (or elements), and one or more communication media within the conduit, the containment system comprising:
  an elongate flexible body mountable on a wall of the conduit to extend longitudinally along the conduit, the body including:
    an elongate sensor cavity, extending longitudinally along the body, for receiving the sensing element(s); and a shield portion including one or more elongate channels, extending longitudinally along the shield portion, each channel for receiving one or more communication media.

In this way, the body of the containment system can be considered to have a sensing region or 'sensing zone', in which the sensing element is housed, and a shielded region or 'shielded zone' (i.e. a region shielded from the conditions in the conduit in which the containment system is installed) within which communication media can be housed and shielded from the interior of the conduit. In some embodiments, as explained further below, the body of the containment system can have a central chassis portion including the sensing region. The chassis portion can also provide some or all of the shield portion in which the channels for communication media are formed. In some embodiments, the width of the shield portion is extended beyond the chassis portion by wings extending laterally outwardly from the chassis portion.

Implementation of a sensor system (e.g. optical fibre sensor system) in a sewer network will typically require many separate sections of the sewer network, which can be viewed as a 'trunk and branch' network, to be connected to a central interrogator. Whilst only one optical fibre is performing the sensing duty at given point, many other fibres (for example those emanating from branches and their sub-branches) will need to be safely routed through the system to the interrogator.

For the avoidance of doubt, we note that the term "sewer" used herein is intended to include at least foul water sewers, rainwater drains and groundwater drains and equivalent surface drainage channels.

Hence it is advantageous for the containment system to house both the sensor fibre and these 'networking' fibres, as can be accommodated by the first aspect of the invention set forth above. This dual functionality also means that the sewer operator can, where it so wishes, generate revenues from accommodating additional communications fibres in spare capacity (or even install the containment just for such purposes). In other installations, it may be appropriate to use the containment only for the sensing optical fibre, without also installing communication (or 'networking') fibres.

Accordingly, in a second aspect, the invention provides a containment system for installation internally along a conduit, for locating a sensing element within the conduit, the containment system comprising:
  an elongate flexible body mountable on a wall of the conduit to extend longitudinally along the conduit,
  the body including an elongate sensor cavity, extending longitudinally along the body, for receiving the sensing element.

In some cases, it may be desirable to use a containment system to shield communications media, without the capacity for sensing fluid flow. Accordingly in a third aspect, the invention provides a containment system for installation internally along a conduit, for locating one or more communication media within the conduit, the containment system comprising:
  an elongate flexible body mountable on a wall of the conduit to extend longitudinally along the conduit,
  the body having a shield portion including one or more elongate channels, extending longitudinally along the shield portion, each channel for receiving one or more communication media.

Optional features of the invention will now be set out. These are applicable singly or in any combination with any aspect of the invention.

In the various aspects of the invention, the sensing element may be a sensing optical fibre and the communication media is a communication optical fibre.

In some embodiments, the sensor cavity is on a top side of the shield portion (i.e. the side facing away from the conduit wall when installed) and the elongate channels are on an opposite, bottom side of the shield portion.

In some embodiments, the containment system has a flexible membrane providing a wall of the sensor cavity, one side of the membrane facing the interior of the sensor cavity and the other side of the membrane being exposed, in use, to fluid flow within the conduit outside of the sensor cavity. The sensor element may be mounted on the flexible membrane within the sensor cavity or, alternatively the sensor element may be mounted within the sensor cavity, spaced from the flexible membrane. In some embodiments, there may be two or more sensor elements within the cavity, e.g. one on the underside of the membrane and another spaced from the membrane.

In some embodiments, the body and membrane may all be formed from the same material. Especially where the containment system is formed by extrusion or moulding, this can simplify the manufacturing process compared with cases where different materials are to be co-extruded or moulded. The body and membrane may have a Young's Modulus in the range 2-10 Mpa. One suitable material that can be used to form the body and membrane as a unitary component, with a Young's Modulus in the range 2-10 MPa is EPDM (ethylene propylene diene monomer). In some embodiments, the membrane may be stiffened using additional materials added below the membrane having a Young's Modulus of 300 MPa or more. In other embodiments, a composite membrane of up to 1000 MPa may be employed.

In other embodiments, the Young's Modulus of the membrane may be in the range 300 MPa to 500 MPa. The body, other than the membrane can be stiffer than the membrane and may, for example, have a Young's Modulus in the range 1 GPa to 2 GPa.

In some embodiments, the membrane is formed integrally with the body. It may be joined on either side to adjacent portions of the body by hinge portions. Especially in cases where the membrane has a Young's modulus of 300 MPa or more, the hinge portions may be more flexible than the membrane, for example having a Young's Modulus in the range 100 MPa to 200 MPa or even less.

In some embodiments, there is a compressible substrate within the sensor cavity to support said upper membrane and provide deterministic compression characteristics..

In some embodiments, the sensor cavity has side walls, a bottom wall and a top wall and at least one of the walls or a junction between the walls includes a split along the length of the sensor cavity, which can be spread apart to enable access to the sensor cavity for insertion of the sensing element.

In embodiments of the invention, the one or more communication media may, for example, be communication optical fibres and/or electrical conductors.

The communication media (e.g. optical fibres and/or electrical conductors) may run within ducts (e.g. microducts typically 5 mm overall diameter but ranging from 3-18 mm) received in some or all of the elongate channels in the shield portion. Preferably, each duct is configured so that communication optical fibres can be blown, pushed or pulled through the duct.

In some embodiments, a cross-section of the body, perpendicular to its length, is uniform along a length of the body of at least 30 m, more preferably at least 100 m and up to 200 m or more.

The body is preferably relatively planar in form. That is to say, it has a low profile, with a width that is significantly greater than its height. For example, the width may be at least twice the height, more preferably at least four times the height and the width may be as much as 20 times the height or more. By forming the body with a low profile, it is less likely to cause any obstruction in the conduit. In some embodiments the width of the body, once installed in the conduit, is in the range 30 mm to 100 mm and the maximum height of body from the wall of the conduit, once installed in the conduit, is in the range 5 mm to 15 mm. In other embodiments, the body may have large dimensions, potentially much larger dimensions.

In some embodiments the body is configured such that when installed in the conduit, there is a cavity between the body and the wall of the conduit, whereby an adhesive can be introduced to the cavity during or after installation. Using an adhesive in this not only serves to secure the body within the conduit but it can accommodate different sizes of conduit as well as compensating for irregularities in the internal surface of the conduit wall (e.g. gaps between conduit sections, steps in the wall, etc).

In some embodiments the body has, in cross-section, a central chassis portion that is spaced from the conduit wall once installed and, to either side of the chassis portion, wing portions that extend outwardly from the central portion so that once installed an outer end of each wing portion abuts against the conduit wall. The sensor cavity is typically formed in the chassis portion and the elongate channels are typically formed in the chassis portion and/or the wings.

In some embodiments, the wings may extend in-line with a top surface of the central chassis portion (e.g. in-line with the top surface of the membrane) so that the chassis portion and the wings form a substantially flat surface across the bottom of the conduit. This may be beneficial in some applications to reduce the risk of debris build-up.

In other embodiments, the wings may slope downwardly from the edges of the chassis portion. In this case, an outwardly facing wall of the body at the junction between the central chassis portion and each wing is preferably curved, with a radius of curvature of at least 11 mm such that rodents are unable to gnaw the body.

The outwardly facing wall of the body preferably has a smooth profile with no sharp angles. This helps to avoid debris travelling in a fluid flow in the conduit catching or 'ragging' on the body. In some embodiments this is achieved by a finishing coating applied after installation.

The underside of the body, intended to face the conduit wall once installed, may have one or more keying protrusions (e.g. dovetails or T-shape protrusions), whereby an adhesive securing the body to the conduit wall can key around the keying protrusions.

In some embodiments, there is at least one strengthening element extending longitudinally within the body. Preferably there are a plurality of strengthening elements. The or each strengthening element may, for example, be a string or tape, e.g. made from Kevlar.

Additionally or alternatively, these strengthening elements may be desirable, for example, to match the flexure stiffness of the containment system to the stiffness of the ducts (e.g. microducts), where installed. This can help to ensure that the ducts remain attached during installation. The stiffening member can, for example, be a thin sheet of plastic located at the bottom of the sensor cavity as part of the assembly process.

In a fourth aspect, the invention provides a containment system as set forth in any of the aspects above, installed in a conduit (e.g. a sewer). The body can be secured to the conduit wall with an adhesive, which can also serve to stiffen the body.

In some cases it may be desirable to be able to remove the containment system or the sensing payload sometime after it has been installed. To help enable this, one or more rip cords may be provided between the body and the conduit wall, that can be pulled to shear the adhesive from the conduit wall to help release the body from the wall.

In a fifth aspect, the invention provides a method of installing in a containment system according to any one aspects set forth above, the method comprising:
  providing the containment system; and
  using an adhesive to secure the body of the containment system to a wall of the conduit.

The body of the containment system may conveniently be provided on a reel. In some embodiments, subsequent to adhering the body to the conduit wall, one or more communication optical fibres and/or electrical conductors may be blown through ducts within the shield portion.

The body may be installed by a robot remotely or by a human operative when the sewer diameter is sufficient to permit access. For instance, embodiments of the invention are applicable to sewers (or other conduits) having a diameter of less than 900 mm (for example in the range 100 mm to 600 mm), for which robotic installation would generally be required. Embodiments of the invention can also be deployed in large diameter sewers (or other conduits), having a diameter of 900 mm or more (e.g. 1.2 m or more), in which the containment system could be installed manually (although in some instances robotic installation may still be preferable).

In a further aspect, the invention provides a containment system for installation internally along a conduit, the containment system comprising a main body having a pair of wing portions, one on each side of the main body, the main body defining an open sensor cavity configured to receive at least one sensing element, wherein each wing portion is configured to receive at least one communication media.

The containment system may comprise a plurality of rigid articulations configured to be joined together to form a flexible structure. A coating may be applied to the series of rigid articulations.

The conduit in which the containment system is installed may be flexible or it may be rigid. The containment system may be installed in the base of the conduit. The internal diameter of the conduit, which may be circular in cross section, may be in the range 100 mm to 600 mm The containment system of the present invention is preferably conformable to the inside of the conduit in which it is placed. To help with this, the lower surface or outer profile of the containment system may be arcuate and the lower surface or profile may have a radius of curvature that is similar or identical to the conduit in which it is placed.

BRIEF DESCRIPTION OF THE DRAWINGS

Embodiments of the invention will now be described by way of example with reference to the accompanying drawings in which:

FIG. 1a shows a prior art example of conduit with discrete sensors to detect fluid flow;

FIG. 1b shows the conduit of FIG. 1a in which the discrete sensors are replaced with a continuous optical fibre sensor installed in the base on the conduit within a containment system in accordance with an embodiment of the present invention;

FIG. 2 shows a fibre optic sensor containment system in accordance with an embodiment of the present invention;

FIG. 3a shows a cross section of the fibre optic containment system of FIG. 2;

FIG. 3b shows a cross section of the fibre optic containment system of FIG. 2 in a pre-installation configuration;

FIG. 5b is an enlarged view of the bottom portion of FIG. 5a;

FIG. 6 shows a perspective view of a section of the fibre optic sensor containment system of FIG. 2 in situ in a conduit;

FIG. 7 shows a perspective view of a section of the fibre optic sensor containment system of FIG. 2, in a configuration for installation of a sensor optical fibre assembly;

FIG. 8a schematically shows a longitudinal cross section of a conduit section including a junction of two pipes with a containment system in accordance with an embodiment of the invention installed in the base of the conduit;

FIG. 8b schematically shows a longitudinal cross section of another conduit section including a junction of two pipes with a containment system in accordance with an embodiment of the invention installed in the base of the conduit;

FIGS. 9a and 9b show a second embodiment of the containment structure of the present invention.

FIGS. 11a-11c show different views of an articulation of the containment system of FIGS. 9a and b.

FIG. 12 schematically illustrates the installation of a containment system according to an embodiment of the invention into a conduit (e.g. sewer) from a reel; and FIG. 13 schematically illustrates one example sewer network in which an embodiment of the present invention might be installed.

DETAILED DESCRIPTION AND FURTHER OPERATIONAL FEATURES OF THE INVENTION

Figure 5C:
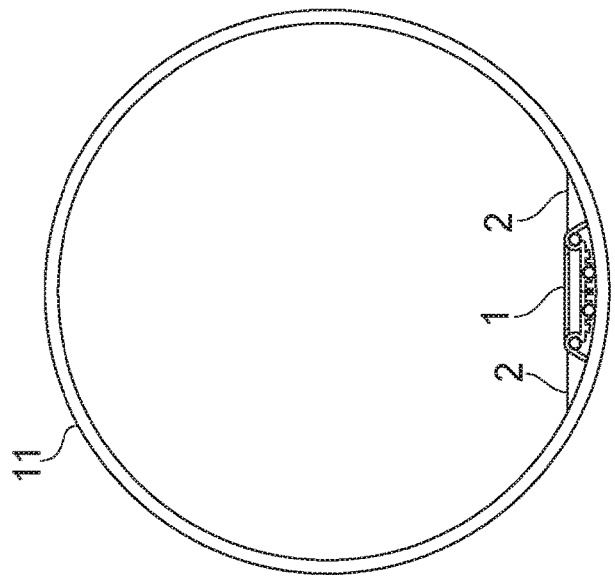
FIG. 5c shows an alternative fibre optic sensor containment system, in cross-section, installed in the base of a conduit.

The embodiment of the invention described here comprises a containment system for a continuous sensor in an open conduit where the sensor may operate by detecting small amounts of vibration and deflection. The containment system is arranged such it transfers small vibrations and deflections to the sensor whilst being sufficiently robust to resist the environment found in a sewer and conform to the shape of the conduit.

In this example, the containment system comprises a continuous profile which is manufactured in an open state, wherein a sensor is installed into the opening of the continuous profile, which is then subsequently closed and sealed to form an enclosed space suitable for containing and protecting the sensor from the environment outside the profile.

The containment system comprises an enclosable continuous profile for protecting a sensor and channels (that in this example are open to a lower side, although will be closed by adhesive when installed) for accepting communications ducting, where the containment system partially covers the ducting, protecting it from the environment outside the profile. When adhered or otherwise attached to the host conduit, the duct is completely enclosed and protected.

The containment profile, when in its closed configuration, has a smooth form factor on at least one side wherein the radius of curvature of this surface is such that its resists chewing by rats.

The containment is flexible enough to be wound on to a reel for installation at an appropriate site and dispensed through a small opening requiring a bend radius of 200 mm.

FIG. 1b shows an angled conduit with a dynamic pressure wave where flow is in the direction of the arrow and where continuous sensor containment system (1) can convey the pressure variations to the sensor.

FIG. 2 shows a fibre optic sensor containment system in accordance with an embodiment of the invention, having a body (1). The containment system is illustrated in its final, sealed state comprising a top plate or membrane (2), joined by flexible hinges (3) to a main body or chassis (4). A sensing zone (or sensor cavity) is formed within the containment system below the membrane (2) within which a sensing element (e.g. an optical fibre) can be housed and be acted on by pressure applied to the membrane whilst being offered protection from the fluid flow in the conduit. Below the sensing zone is a shielded zone, adapted to carry one or more communications fibres, as discussed further below.

FIG. 3a shows a cross section of the body (1), comprising the membrane (2), flexible hinges (3), main body or central chassis (12), wings (4), sensor cavity (5), lower fibre optic duct channel (6), dovetail adhesive key (7) and upper fibre optic duct channel (8). The central chassis (12) below the sensor cavity, in combination with the wings (4) define a shield portion so as to provide the shielded region or zone, within which the communication fibres are housed and are shielded from the interior of the conduit above the containment system.

FIG. 3b shows the body as in FIG. 3a but in a manufacturing state where the flexible hinges (3') are in a flexed state, opening the main body at sealing edges (9) and creating an assembly aperture (10), through which a sensor element can be introduced to the sensor cavity.

Figure 4:
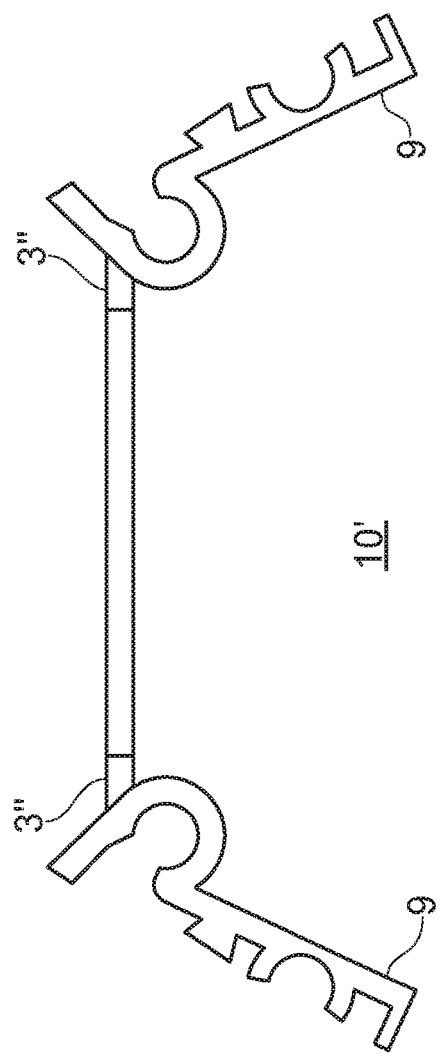
FIG. 4 shows a cross section of the fibre optic containment system of FIG. 2 in a more open pre-installation configuration.

FIG. 4 shows the body as in FIG. 3b but in an assembly state where flexible hinges (3") have been flexed further to increase the assembly aperture (10') between sealing edges (9).

In some embodiments, the body may be sufficiently flexible to be flexed into the configurations shown in FIGS. 3b and 4 without the need for discrete hinges (3").

Figure 5A:
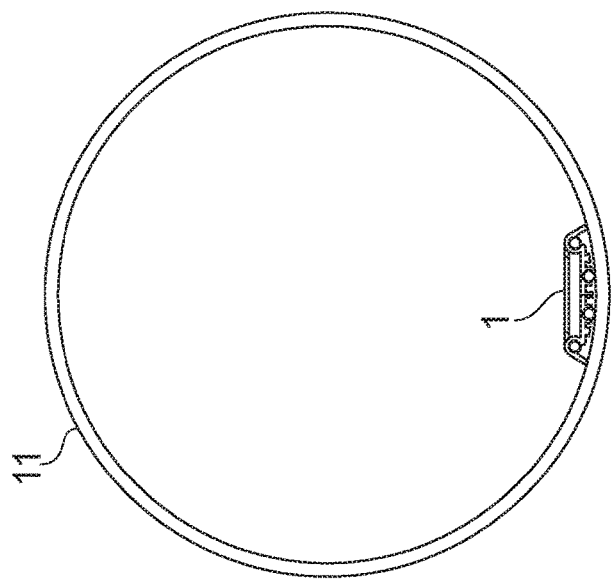
FIG. 5a shows the fibre optic sensor containment system of FIG. 2, in cross-section, installed in the base of a conduit.

FIG. 5a shows the body (1) installed in the base of a conduit (11). The body is secured to the conduit wall with an adhesive that fills the cavity between the conduit wall and the underside of the body. The adhesive also serves to stiffen the body once it is installed, and to enable the ducts to be fully enclosed. The same size of body can be used in a range of different size conduits, with the volume of adhesive being adapted accordingly.

Figure 5B:
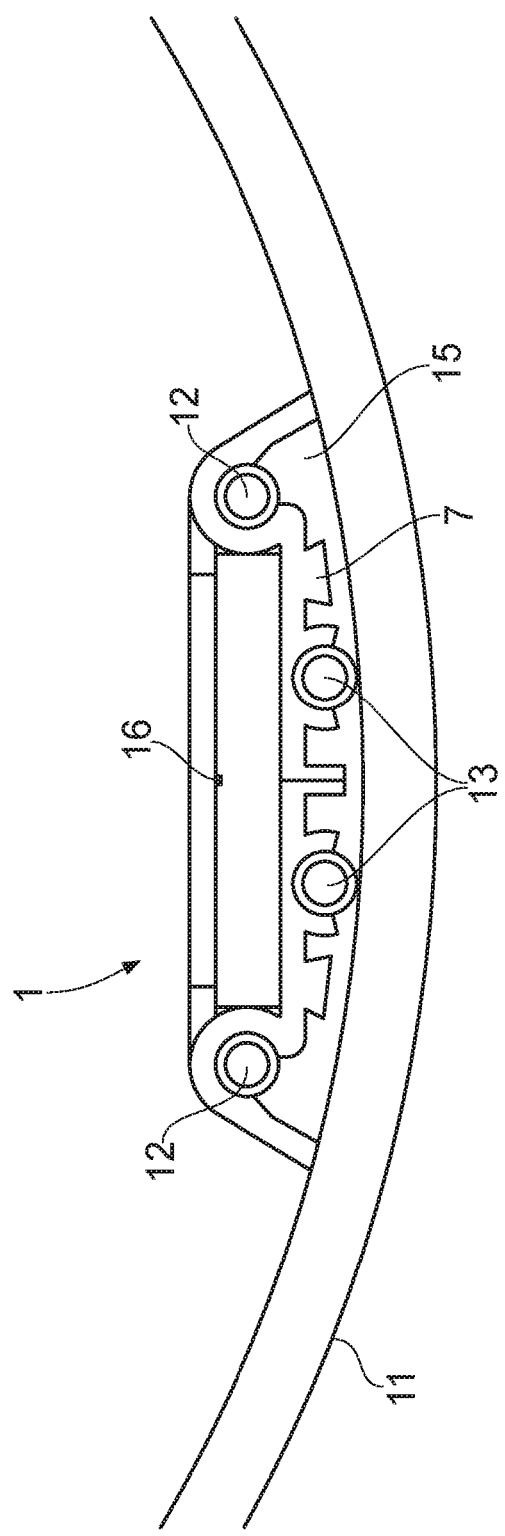

FIG. 5b shows an enlarged view of the body (1) attached to the conduit (11). In this example, you can see upper fibre optic microducts (12), lower fibre optic microducts (13), dovetail adhesive key (7), adhesive cavity (15) and sensor fibre (16). Communication optical fibres can be blown (or pulled, or pushed) through the microducts (12,13) after the containment system has been installed in the conduit.

For some applications, it may be desirable that the containment system forms a flat surface in the base of the conduit. As illustrated in FIG. 5c, this can be achieved by providing additional extension elements extending horizontally on either side of the body (1) that span the gap from the upper edge of the body to the wall of the conduit. These extension elements (2) may be formed integrally with the body (1) or may be added during installation.

FIG. 6 shows a perspective view of the containment system assembly in situ comprising upper (12) and lower (13) microducts for communications fibre optic bundles or cables.

FIG. 7 shows the construction of the sensing zone within the body. In this example there is a first main body half (17) and a second main body half (18), shown here in a splayed position around a membrane (19) and sensor fibre (16), where a layer of backing foam (20) is being inserted over the sensor fibre.

The containment system offers the advantage that it can easily accommodate discontinuities in the conduit wall.

For example, FIG. 8a shows a cross section of two adjacent pipe sections (21, 22) of the conduit separated by a gap (23). The containment system bridges the gap (23) and adhesive layer (24) adheres the containment system (1) to the surface of the pipe. It can be seen that the adhesive has filled the gap (25) underneath the containment system caused by the gap (23) between the two pipe sections. Thus, the body of the containment system (and the fibres it carries, including the sensor fibre) are not distorted at the gap in the conduit.

Similarly, FIG. 8b shows a cross section of two adjacent pipe sections (21, 22) of the conduit radially offset (26) from one another, forming a step. The containment system (1) bridges the offset and the adhesive layer (24) adhering the body of the containment system (1) to the walls of the pipes fills the gap underneath (27) the body caused by the step. In this way, the body and the fibres it carries, follows a smooth line from the base of one pipe to the adjacent pipe with no sudden step changes that might damage the fibres or impact on their performance.

FIG. 9 shows an alternative embodiment of the containment system. In this embodiment, the containment system comprises a plurality of rigid articulations 31 that are joined together to form a flexible structure that is configured to conform to the interior surface of a conduit. The articulations may be interlocking. A continuous prismatic sensing zone 41 comprises a sensor strip that sits within the series of articulations and contains the sensing optical fibre.

Figure 10A:
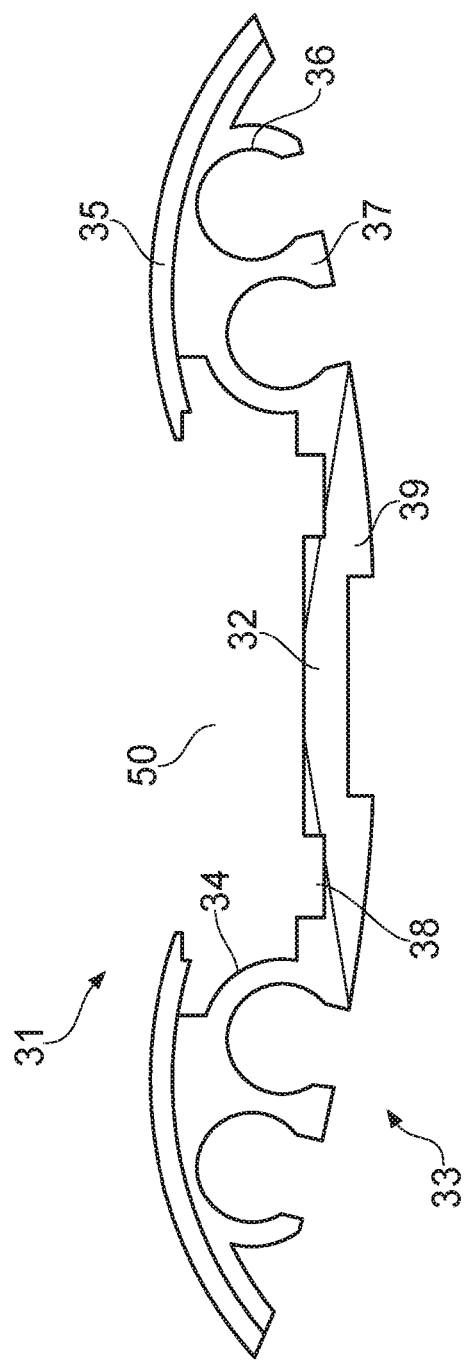
FIGS. 10a and 10b show longitudinal cross sections of an articulation of the containment structure of FIGS. 9a and b.

FIG. 10a shows a cross-section of an individual articulation 31. The individual articulations 31 may be made from a hard polymer, such as polypropylene. The articulations may be made by injection moulding. Each articulation may be fabricated as a single article.

Figure 10B:
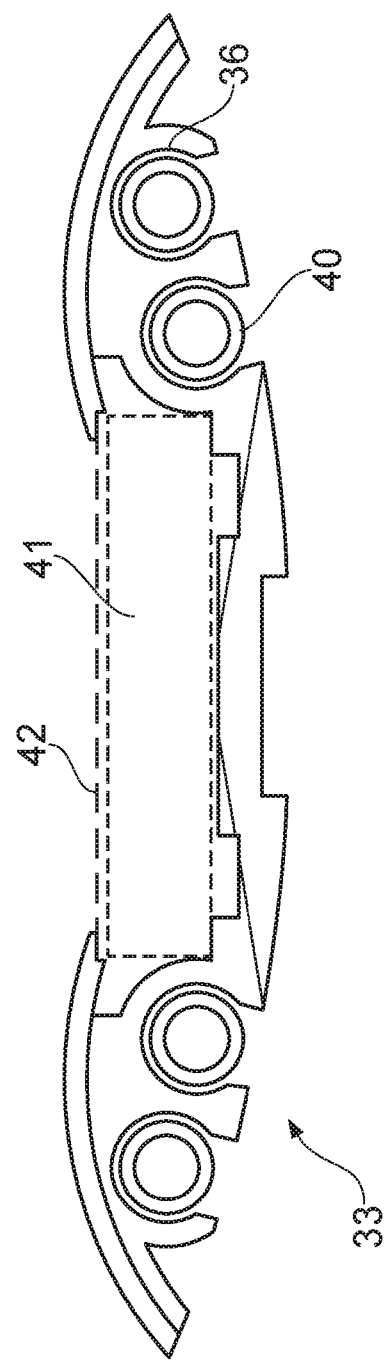

The main body of the articulations comprises a central chassis 32 and a sensor cavity 50 in which a sensor strip or zone, containing the sensing element, is contained. FIG. 10b shows a cross section of an articulation 31 with the sensor strip 41 in place in the cavity 50. The sensor strip 41 may be formed by extrusion or from a lay-up of strip materials. The sensor strip therefore sits above the central chassis 32 of each articulation.

Sensor cavity 50 is an open cavity, by which we mean that the form of the cavity permits the sensing strip to be able to measure the pressure exerted by the fluid within a conduit in which the containment system is located. Thus an "open cavity" requires that the sensing zone containing the sensing element (e.g. an optical fibre) can be acted on by the fluid within the conduit. It is preferable that the sensing element is also offered protection from the conditions in the conduit. There may be examples in which the cavity is fully open, that is no further element is between sensor strip 41 and the exterior of the articulation 31, or other examples (as described below) in which a membrane extends over the sensor strip 41. The provision of a membrane element, which is relatively thin compared to the rest of the containment system, does not close the cavity, as long as the pressure of the fluid in the conduit is still permitted to reach the sensor strip through the membrane. The membrane is typically between 0.5 mm and 3 mm thick.

In a preferred embodiment, the containment system comprises a flexible membrane 42, shown in place in above the sensing strip in FIG. 10b, that is formed from a different material to that of the rigid articulations 31. Preferably, the membrane is impermeable. The membrane 42 performs the same function as that of the first embodiment of the containment system. The flexible membrane may provide a wall of the sensor cavity, one side of the membrane facing the interior of the sensor cavity and the other side of the membrane being exposed, in use, to fluid flow within the conduit outside of the sensor cavity. The membrane may be integral with the sensor strip, for example the membrane may comprise the upper surface of a lay-up of strip materials.

The sensing element can therefore be housed in the open cavity and be acted on by pressure applied to the membrane whilst being offered protection from the fluid flow in the conduit.

In an alternative embodiment, the membrane may be porous. In this case, the pore size of the membrane can be chosen such that the ingress of dirt particles into the cavity and sensing zone is prevented.

Each articulation comprises wing portions, shown generally at 33 in FIGS. 10a and 10b. The wing portions are on either side of the main body of the articulations.

The central chassis 32 is connected to the wing portions 33, which extend outwardly from the central chassis, by connecting regions 34 of the wing portions. These relatively thin regions of the wing portions may provide some flexure to allow the sensor strip to be installed within the sensor cavity. In one embodiment, the regions 34 may comprise longitudinal hinges which extend along the length of the articulation. The hinges may be integrally moulded living hinges.

The wings of this embodiment define a shield portion so as to provide the shielded region or zone, within which the communication fibres are housed and are shielded from the interior of the conduit. The wings 33 comprise channels 36 which may contain communications media. When the articulations are joined together, the individual channels 36 define a continuous elongate channel along the containment system. In FIG. 10b, the channels 36 are shown containing ducts 40 which can house communication fibres within them (not shown). The fibres may be inserted or blown into the ducts. The communications fibres may be optical fibres, or they may use different underlying technologies. For example, the communication media may alternatively comprise cables.

The ducts 40 may be cylindrical. The ducts have an external radius smaller than that of the internal radius of the channels 36 in the articulations to allow free movement of the ducts within the channels and to aid bending of the containment system. Therefore, the ducts may have a diameter such that there is residual space around the ducts in the channels and thus the ducts are not a snug fit. This feature allows for continuous curving of the containment structure around corners, or when there are changes in height of the base of the conduit and ensures that the ducts maintain a smooth curve as the respective articulations flex at their joints. There may also be radial space between the fibre or cable and the ducts.

The articulations 31 and resulting modular containment system have a cross section that conforms to the curvature of the internal wall of the pipe and minimises hydrodynamic impact on flow. For example, the articulations may be sized to conform to the interior curvature of a 225 or 300 mm diameter pipe.

The articulations comprise grooves 38 in which pull tapes may sit to provide strength to the containment system in tension. The pull tapes may be coupled to the articulations and sensing zone by friction. The pull tapes can be used to deploy the containment structure in the conduit and may optionally be secured to the structure at one end.

The articulations of the containment system may have a keyed and/or textured base to enhance bonding of the containment structure to the inner wall of the conduit pipe. Such a key is shown at 37 in FIG. 10a. These keys provide a larger surface area for adhesive to flow around to bond the structure to the conduit wall. Adhesive may also be applied in the gaps between the sides of sensor strip 41 and the underside of shields 35 and in notches under the central chassis 32.

The lower portion of the vertical edges of each articulation which abut the adjacent articulations may be sloped or bevelled, shown at 39 (see in particular FIG. 11c), to allow the articulated structure to undergo extra curvature when bending and conforming to the inner wall of the conduit.

Each articulation comprises joint shields 35 at the top of each wing portion 33 on each side of the sensor cavity. FIGS. 11a-c show the shields 35 in more detail. FIG. 11a is a projected view of an articulation 31. FIGS. 11b and 11c show a single articulation in plan and from the side respectively.

The shields extend beyond the main body of the articulation in the axial direction on one side of the articulation only. On the other side of the articulation, the shields do not extend to the edge of the main body of the articulation and a space is left for the extended portion of the shield of the adjacent articulation. This allows the extended region of the shield of the adjacent articulation to overlap and protect the joint between the present articulation and the adjacent articulation. This helps to prevent debris from penetrating the joints between articulations and entering the ducts. The overlapping joints between articulations give protection to the shielded portion of the containment system, while allowing flexure in two planes. The presence of the extended region of the shield 35 at one end of each articulation also aids assembly of the containment structure, as the articulations will only fit together in one configuration (i.e. the extended regions of all articulations facing in the same axial direction). The highest point of the upper surface of the joint shields sit at a higher vertical level than the top surface of the membrane and the sensor strip, such that the membrane and sensor strip are protected from falling objects, and/or from being damaged by service personnel who may tread on the system.

A finishing coating may be applied to the series of rigid articulations to create a smooth, low friction surface. The individual articulations and/or the sensor strip and/or the series of rigid articulations may be coated with an abrasion resistant and/or low friction coating. The abrasion resistant coating may be a tungsten carbide-based coating. The low friction coating may be a silicone-based coating. This may help to avoid wear of the containment system and improve flow of the water over the containment system. Alternatively or additionally, the surface of the articulations or the sensor strip may be reinforced with fibres, such as Kevlar or glass fibres for improved strength relative to the un-reinforced material.

The containment system of the present invention does not encapsulate the sensor element and/or the communications media that may be located within the sensor cavity and/or channels of the system. The channels of the containment system and any element they may contain (such as communications media) are open to the outside of the structure when the structure is not installed in a conduit.

The channels of the containment system comprise a void containing no communications media. The channels comprise a void that extends along the length of the containment system. The void may or may not have communications media installed in the void.

The benefits of this embodiment include:
Increased protection from crush due to the rigidity of the articulations as a result of them being made from a hard material.
Increased protection of the sensing zone from dropped tools, large pieces of debris or the feet of service personnel. The top surface of the joint shield sits vertically above the plane of the sensor strip and membrane, and so any items such as tools dropped onto the containment structure, or the foot of a service person, will be prevented from coming into contact with the membrane or sensor strip.
Increased fibre count due to an increased size of duct while maintaining a hydrodynamically acceptable shape.
Increased modularity, allowing substitution of different articulation designs and sensing zones.
Variation of the length of the containment system is possible without having to cut the shielding portions with tools, which may cause damage and prevent effective shielding of the communication cables within the shielding zone.

FIG. 12 shows a conduit (e.g. a sewer pipe) (21) under ground level (28) where containment system (1) is fed into pipe (21) via access downpipe (29) from a reel (30). Once the containment system is installed, communication fibres may be blown through the ducts within the body.

The body of the containment system may be formed by extrusion. The ducts can be either formed during the extrusion (i.e. a co-extrusion), installed in the body as it is being extruded (i.e. the body could be extruded over the ducts) or the ducts can be installed subsequently. The membrane wall of the sensor cavity is formed as part of the extrusion. The sensor element (e.g. optical fibre) and any backing foam can be installed into the sensor cavity in the body through a slit that can either be formed as part of the extrusion or subsequently cut.

The extrusion may be formed from polymers such as TPE/TPV, or synthetic rubbers such as EPDM. It may be secured using polymer resin-based adhesives such as acrylates and epoxies, or using cement based adhesives.

FIG. 13 shows, schematically, an example of a sewer network in which a containment system of the present invention could be installed. As shown here, sewer systems typically have a dendritic-type configuration having a number of branches (1, 2, 3, 4, 5, 6, 7). It may be desirable to have a separate flow sensor optical fibre for each branch, all of which terminate at the same, shared detector.

Conveniently, using the containment system of the present invention, in each branch the sensor fibre for that branch can be housed in the sensor cavity (5) of the containment system. The portions of this sensor fibre that extend within other branches can be housed within the shielded zone of the containment system. For example, a sensor fibre for branch 5 would be in the sensor cavity (i.e. sensing zone) of the containment system in branch 5 but in the shielded zone (e.g. within a microduct held in one of the channels) of the containment system in branches 4, 3 and 1 (assuming the detector was at the bottom end (as illustrated) of branch 1.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

The invention claimed is:

1. A containment system for installation internally along a conduit, for locating at least one sensing element within the conduit, the containment system comprising:
    an elongate flexible body mountable on a wall of the conduit to extend longitudinally along the conduit,
    the body including an elongate sensor cavity, extending longitudinally along the body, for receiving the at least one sensing element, the system further comprising a flexible membrane providing a wall of the sensor cavity, one side of the membrane facing the interior of the sensor cavity and the other side of the membrane being exposed, in use, to fluid flow within the conduit outside of the sensor cavity and being configured to transfer pressure fluctuations of the fluid flow to the at least one sensing element.

2. A containment system according to claim 1, wherein the sensing element is a sensor optical fibre.

3. A containment system according to claim 1, further comprising a sensing element within the sensor cavity.

4. A containment system according to claim 1, wherein the sensor cavity has side walls, a bottom wall and a top wall and at least one of the walls or a junction between the walls includes a split along the length of the sensor cavity, which can be spread apart to enable access to the sensor cavity for insertion of the sensing element.

5. A containment system according to claim 1, wherein the body is configured such that when installed in the conduit, there is a cavity between the body and the wall of the conduit, whereby an adhesive can be introduced to the cavity during or after installation.

6. A containment system according to claim 1, wherein the body has, in cross-section, a central chassis portion that is spaced from the conduit wall once installed and, to either side of the chassis portion, wing portions that extend outwardly from the central portion so that once installed an outer end of each wing portion abuts against the conduit wall.

7. A containment system according to claim 6, wherein the wings extend in-line with a top surface of the central chassis portion so that the chassis portion and the wings form a substantially flat surface across the bottom of the conduit when the containment system is installed.

8. A containment system according to claim 6, wherein an outwardly facing wall of the body has a smooth profile with no sharp angles.

9. A containment system according to claim 6, wherein the sensor cavity and/or the elongate channels are formed in the chassis portion.

10. A containment system according to claim 1, wherein an underside of the body, intended to face the conduit wall once installed, has one or more keying protrusions, whereby an adhesive securing the body to the conduit wall can key around the keying protrusions.

11. A containment system according to claim 1, installed in a conduit.

12. An installed containment system according to claim 11, further comprising an adhesive between the body and the conduit wall, wherein the adhesive adheres the body to the conduit wall.

13. An installed containment system according to claim 12, wherein the adhesive is continuous along the full length of the body.

14. An installed containment system according to claim 12, wherein the adhesive stiffens the body.

15. An installed containment system according to claim 11, further comprising a protective coating applied over the body after installation.

16. An installed containment system according to claim 11, further comprising a plurality of communication fibres and/or electrical conductors within the one or more elongate channels.

17. An installed containment system according to claim 16, wherein at least some of the plurality of communication optical fibres and/or electrical conductors are within one or more ducts that are received in the elongate channels.

18. A method of installing in a containment system according to claim 1 in a conduit, the method comprising:
    providing the containment system according to claim 1; and
    using an adhesive to secure the body of the containment system to a wall of the conduit.

19. A method according to claim 18, further comprising, subsequent to adhering the body to the conduit wall, blowing one or more communication optical fibres and/or electrical conductors through ducts within the body.

20. A containment system according to claim 1, wherein the containment system comprises a plurality of rigid articulations configured to be joined together to form a flexible structure.

21. A containment system according to claim 1, the containment system is for co-locating the at least one sensing element and one or more communication media within the conduit, the body further including a shield portion including one or more elongate channels, extending longitudinally along the shield portion, each channel for receiving one or more communication media.

22. A containment system according to claim 21, wherein the sensing element is a sensing optical fibre and the communication media is a communication optical fibre.

23. A containment system according to claim 21, wherein the sensor cavity is on a top side of the shield portion and the elongate channels are on an opposite, bottom side of the shield portion.

* * * * *